United States Patent
Verhelst et al.

(12)

(10) Patent No.: US 6,881,783 B1
(45) Date of Patent: Apr. 19, 2005

(54) PROCESS FOR MAKING A PIPA-POLYOL

(75) Inventors: Gabriel A Verhelst, Boortmeerbeek (BE); Alphonse E J Bruyninckx, Kortenberg (BE)

(73) Assignee: Huntsman International LLC, Salt Lake City, UT (US)

( * ) Notice: Subject to any disclaimer, the term of this patent is extended or adjusted under 35 U.S.C. 154(b) by 0 days.

(21) Appl. No.: 09/979,838

(22) PCT Filed: May 5, 2000

(86) PCT No.: PCT/EP00/04037

§ 371 (c)(1),
(2), (4) Date: Mar. 13, 2002

(87) PCT Pub. No.: WO00/73364

PCT Pub. Date: Dec. 7, 2000

(30) Foreign Application Priority Data

May 31, 1999 (EP) .............................. 99110479

(51) Int. Cl.[7] ............................. C08G 18/30
(52) U.S. Cl. ................ 524/762; 523/453; 523/454; 252/182.27

(58) Field of Search ............ 524/762; 525/453, 525/454; 252/182.27

(56) References Cited

U.S. PATENT DOCUMENTS

| | | | |
|---|---|---|---|
| 4,438,252 A | | 3/1984 | Carroll et al. |
| 4,452,923 A | * | 6/1984 | Carroll et al. |
| 5,068,280 A | | 11/1991 | Pal et al. |
| 5,292,778 A | | 3/1994 | Van Veen et al. |
| 6,068,790 A | | 5/2000 | Postema et al. |

FOREIGN PATENT DOCUMENTS

| | | |
|---|---|---|
| EP | 0116758 | 8/1984 |
| EP | 0318242 | 5/1989 |
| WO | WO 94/20558 | 9/1994 |

\* cited by examiner

*Primary Examiner*—Rachel Gorr
(74) *Attorney, Agent, or Firm*—Pillsbury Winthrop LLP

(57) ABSTRACT

Process for preparing a polyol comprising particulate material is dispersed from and in an amount 30–80% by weight.

9 Claims, No Drawings

PROCESS FOR MAKING A PIPA-POLYOL

This application is the U.S. National Phase of International Application PCT/EP00/04037 filed May 5, 2000, which claims priority to European Patent Application 99110479, filed May 31, 1999.

The present invention is concerned with a process for preparing PIPA polyols. PIPA polyols have been disclosed before, see e.g. U.S. Pat. No. 4,452,923, U.S. Pat. No. 4,438,252, U.S. Pat. No. 4,554,306, GB 2102822, WO 94/12553. PIPA polyols are polyaddition reaction products of a polyisocyanate and a low molecular weight compound, having a plurality of hydroxyl, primary amine and/or secondary amine groups, made in the presence of high molecular weight polyols, in particular polyether polyols. The PIPA polyol is a dispersion of particulate material in a polyol and is used e.g. in making slabstock or moulded flexible foams with improved load-bearing properties. The amount of PIPA polyol used in formulations for making such foams conventionally is such that the amount of particulate material calculated on all high molecular weight polyol used in the formulation is 1–15% by weight. The most commonly used PIPA polyol nowadays probably is a PIPA polyol having about 20% by weight of particulate material, which is diluted with further high molecular weight polyol to the above 1–15% by weight loading range.

It would be desirable to be able to provide PIPA polyol with a considerably higher loading. It would allow the foam producer to use PIPA polyol with higher loadings for making the foam. Even if the foam producer would dilute the PIPA polyol with a higher loading, it would have the advantage that the PIPA polyol can be transported in a more concentrated form and is diluted at the place where it is needed and to the extent needed. Further it provides the polyurethane systems' formulator with less formulation restrictions. The foams made from such PIPA polyols show good fire retardancy properties and are easily recyclable.

Processes for making such PIPA polyols, with a higher loading, are known, see e.g. the prior art mentioned before. However these processes lead to products which have a high viscosity and/or are not stable or these processes lead, certainly at a larger scale, to an uncontrollable reaction which gives PIPA polyols which could cause foam collapse when used in making flexible polyurethane foams.

Surprisingly, we have found a process for making such PIPA polyols with a high content of particulate material, a low viscosity and a good stability.

Therefore the present invention is concerned with a process for preparing a polyol comprising particulate material in dispersed form, the amount of particulate material being 30–80% by weight and preferably 40–70% by weight calculated on the total composition wherein an isocyanate reactive compound comprising a plurality of hydroxyl, primary amine and/or secondary amine groups and having an equivalent weight of up to 400 is emulsified in a polyol, having an equivalent weight of 1000–5000 and an average nominal hydroxy functionality of 2–6, at a temperature of 60–100° C. under high shear mixing conditions, a polyisocyanate is added gradually to the emulsion so formed while maintaining the temperature between 60–120° C., preferably 70–110° C., and while maintaining high shear conditions, the reacting mixture, obtained after all polyisocyanate has been added, is allowed to react further for a period of time of 10 minutes—2 hours, preferably 15 minutes—1 hour, while maintaining the temperature between 60–120° C., preferably 70–110° C., the high shear mixing is discontinued, and optionally the polyol so obtained and comprising the particulate material in an amount of 30–80% by weight in dispersed form is cooled to ambient temperature.

In the context of the present application the following terms have the following meaning:

1) The expression "polyurethane foam" as used herein generally refers to cellular products as obtained by reacting polyisoycanates with isocyanate-reactive hydrogen containing compounds, using foaming agents, and in particular includes cellular products obtained with water as reactive foaming agent (involving a reaction of water with isocyanate groups yielding urea linkages and carbon dioxide and producing polyureaurethane foams).

2) The term "average nominal hydroxyl functionality" is used herein to indicate the number average functionality (number of hydroxyl groups per molecule) of the polyol composition on the assumption that this is the number average functionality (number of active hydrogen atoms per molecule) of the initiator(s) used in their preparations although in practice it will often be somewhat less because of some terminal unsaturation. The term "equivalent weight" refers to the molecular weight per isocyanate reactive hydrogen atom in the molecule.

3) The word "average" refers to number average unless indicated otherwise.

The polyol having an average equivalent weight of 1000–5000 and an average nominal hydroxy functionality of 2–6 (hereinafter referred to as compound 1) may be selected from polyols known in the art. Preferably the polyols have an average equivalent weight of 1000–3000 and an average nominal hydroxy functionality of 2–4.

Compound 1 may be selected from polyether polyols, polyester polyols, polyesteramide polyols, polythioether polyols, polycarbonate polyols, polyacetal polyols and polyolefin polyols.

Polyether polyols, which may be used, include products obtained by the polymerization of a cyclic oxide, for example ethylene oxide, propylene oxide, butylene oxide or tetrahydrofuran in the presence of polyfunctional initiators. Suitable initiator compounds contain a plurality of active hydrogen atoms and include water, butanediol, ethylene glycol, propylene glycol, diethylene glycol, triethylene glycol, dipropylene glycol, ethanolamine, diethanolamine, triethanolamine, toluene diamine, diethyl toluene diamine, phenyl diamine, toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol and sorbitol. Mixture of initiators and/or cyclic oxides may be used.

The polyether polyols preferably are those based on propylene oxide (PO) and/or ethylene oxide (EO). When they are based on both EO and PO the amount of oxyethylene groups in the polyol may vary from 5–90% by weight, preferably 5–50% by weight and most preferably 5–25% by weight calculated on the weight of the polyol. If polyols are used comprising oxypropylene and oxyethylene groups, the polyols maybe block copolymers, random copolymers and combinations thereof. A particularly preferred polyether polyol is a polyoxypropylene polyoxyethylene polyol having 5–25% by weight of oxyethylene groups which are at the end of the polymer chains (so-called EO-tipped EO/PO polyols).

Polyester polyols which may be used include hydroxyl-terminated reaction products of polyhydric alcohols such as ethylene glycol, propylene glycol, diethylene glycol, 1,4-butanediol, neopentylglycol, 1,6-hexanediol, cyclohexane dimethanol, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof. Polyesters obtained by the polymerization of lactones for example caprolactone, in conjunction with a polyol, or of hydroxy carboxylic acids such as hydroxy caproic acid, may also be used.

Polyesteramide polyols may be obtained by the inclusion of aminoalcohols such as ethanolamine in polyesterification mixtures.

Polythioether polyols which may be used include products obtained by condensing thiodiglycol either alone or with other glycols, alkylene oxides, dicarboxylic acids, formaldehyde, amino-alcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerizing cyclic acetals.

Suitable polyolefin polyols include hydroxy-terminated butadiene homo- and copolymers and suitable polysiloxane polyols include polydimethylsiloxane diols and triols.

Preferably polyether polyols or mixtures of polyether polyols are used as compound 1.

The isocyanate reactive compound having a plurality of —OH,>NH and/or —NH$_2$ groups and an equivalent weight per active hydrogen atom of up to 400 (hereinafter referred to as 'compound 2') preferably has an equivalent weight of up to 200 and may be selected from alkanolamines, low equivalent weight amine-initiated polyether polyols, hydrazines, dihydrazides, urea, low equivalent weight hydroxyl-terminated compounds such as ethylene glycol, glycerine, glycol ethers, pentaerythritol or mixtures thereof.

Suitable alkanolamines include mono-, di- and trialkanolamines, particularly those wherein the alkanol groups have from 2 to 6, preferably 2 to 3 carbon atoms. The mono- and dialkanolamines may also have a single N-alkyl substituent, preferably having from 1 to 6 carbon atoms. Preferred among these are monethanolamnine, diethanolamine, triethanolamine, N-methylethanolamine, N-ethylethanolamine, N-butyl-ethanolamine, N-methyldiethanolamine, diisopropanolamine, triisopropanolamine, N-methylisopropanolamine, N-ethylisopropanolamine and N-propylisopropanolamine.

Suitable primary and/or secondary amines include polyhydric aliphatic, arylaliphatic, cycloaliphatic and aromatic amines including, for example, ethylene diamine, 1,2- and 1,3-propylene diamine, tetramethylene diamine, hexamethylene diamine, dodecamethylene diamine, trimethyldiaminohexane, N,N'-dimethylethylenediamine, higher homologues of ethylene diamine such as diethylene triamine, triethylenetetramine and tetraethylenepentamine, homologues of propylene diamine, 4-aminobenzylamine, 4-aminophenylethylamine, piperazine, N,N'-bisaminoethyldipropylene triamine, and 1-amino-3,3,5-trimethyl-5-aminomethylcyclohexane.

Suitable hydrazines include hydrazine itself and mono-substituted or N,N'-disubstitued hydrazines having substituent groups such as $C_1$–$C_6$ alkyl, cyclohexyl or phenyl groups. Hydrazine itself is preferred among these.

Suitable hydrazides include the hydrazides of multifunctional carboxylic acids such as carbonic acid, oxalic acid, malonic acid, succinic acid, adipic acid, sebacic acid, azelaic acid, maleic acid, fumaric acid, phthalic acid, isophthalic acid and terephthalic acid, and the esters of a hydrazine monocarboxylic acid with dihydric or polyhydric alcohols and phenols.

Most preferred 'compounds 2' are alkanol amines wherein the alkanol groups have 2–6 carbon atoms, in particular the di- and trialkanol amines. The most preferred compound is triethanolamine.

The polyisocyanate used in making the PIPA polyol may be selected from aliphatic, aromatic and/or cycloaliphatic ones. Examples are diisocyanates such as m- or p-phenyl diisocyanate, toluene-2,4-diisocyanate, toluene-2,6-diisocyanate, mixtures of these toluene diisocyanate isomers, hexamethylene-, 1,6-diisocyanate, tetramethylene-1,4-diisocyanate, cyclohexane-1,4-diisocyanate, hexahydrotoluene diisocyanate (and isomers), naphtylene-1,5-diisocyanate, 1-methylphenyl-2,4-phenyldiisocyanate, 4,4'-biphenylenediisocyanate, 3,3'-dimethoxy-4,4'-biphenylene diisocyanate and 3,3'-dimethyldiphenylpropane-4,4'-diisocyanate; triisocyanates such as toluene-2,4,6-triisocyanate and tetraisoycanates such as 4,4'-dimethyldiphenylmethane-2,2', 5,5'-tetraisocyanate.

Preferred polyisocyanates are diphenylmethane diisocyanate (MDI) optionally comprising homologues thereof having an isocyanate functionality of 3 or more (such diisocyanates comprising such homologues are known as crude MDI or polymeric MDI or mixtures of such crude or polymeric MDI with MDI) and modified variants thereof.

The diphenylmethane diisocyanate (MDI) used may be selected from 4,4'-MDI, 2,4'-MDI, isomeric mixtures of 4,4'-MDI and 2,4'-MDI and less than 10% by weight of 2,2'-MDI, and modified variants thereof containing carbodiimide, uretonimine, isocyanurate, urethane, allophanate, urea and/or biuret groups. Preferred are 4,4'-MDI, isomeric mixtures of 4,4'-MDI and 2,4'-MDI and less than 10% by weight of 2,2'MDI and uretonimine and/or carbodiimide modified MDI having an NCO content of at least 20% by weight and preferably at least 25% by weight and urethane modified MDI obtained by reacting excess MDI and polyol having a molecular weight of at most 1000 and having an NCO content of at least 20% by weight and preferably at least 25% by weight.

Diphenylmethane diisocyanate comprising homologues having an isocyanate functionality of 3 or more are so-called polymeric or crude MDI.

Polymeric or crude MDI are well known in the art. They are made by the phosgenation of a mixture of polyamines obtained by the acid condensation of aniline and formaldehyde.

The manufacture of both the polyamine mixtures and the polyisocyanate mixtures is well known. The condensation of aniline with formaldehyde in the presence of strong acids such as hydrochloric acid gives a reaction product containing diaminodiphenylmethane together with polymethylene polyphenylene polyamines of higher functionality, the precise composition depending in known manner inter alia on the aniline/formaldehyde ratio. The polyisocyanates are made by phosgenation of the polyamine mixtures and the various proportions of diamines, triamines and higher polyamines give rise to related proportions of diisocyanates, triisocyanates and higher polyisocyanates. The relative proportions of diisocyanate, triisocyanate and higher polyisoycanates in such crude or polymeric MDI compositions determine the average functionality of the compositions, that is the average number of isocyanate groups per molecule. By varying the proportions of starting materials, the average functionality of the polyisocyanate compositions can be varied from little more than 2 to 3 or even higher. In practice, however, the average isocyanate functionality preferably ranges from 2.3–2.8. The NCO value of such polymeric or crude MDI is at least 30% by weight. The polymeric or crude MDI contain diphenylmethane diisocyanate, the remainder being polymethylene polyphenylene polyisocyanates of functionality greater than two together with by-products formed in the manufacture of such polyisocyanates by phosgenation of polyamines. Further modified variants of such crude or polymeric MDI may be used as well comprising carbodiimide, uretonimine, isocyanurate, urethane, allophanate, urea and/or biuret groups; especially the aforementioned uretonimine and/or carbodiimide modified ones and the urethane modified ones are preferred. Mixtures of polyisocyanates may be used as well.

The emulsification of compound 2 in compound 1 is conducted at elevated temperature under high shear conditions. The temperature is 60–100° C., most preferably 70–95° C. The high shear mixing of compound 1 and 2 is conducted for a period between 10 minutes and 3 hours preferably and between 30 minutes and 2½ hours most preferably. Those skilled in the art will be able to create high shear mixing conditions using an appropriate mixer. Preferably the mixing is conducted in such a way that the mixing efficiency is similar to or better than the one obtained when using a Silverson HX-30 special at 500 and more revolutions per minute and more preferably at 1000 and more revolutions per minute. Compound 1 and 2 may be combined at ambient conditions and subsequently heated to the above temperature and subjected to high shear mixing. Preferably compound 1 and optionally compound 2 is preheated. This preheating preferably is done while high shear mixing compound 1; hence using the heat generated by the high shear mixing as well. Once the compound 1 is preheated compound 2 is added to it; optionally a small additional amount of compound 1 is added. The addition of the polyisocyanate is gradually. Gradually in this context means that the polyisocyanate is added over a certain extended period of time such that the time between the first and the last addition is 1–100 hours, preferably 2–50 hours, more preferably 2–20 hours; preferably the addition of the polyisocyanate is conducted in such a way that at least 5% by weight of the total amount of the polyisocyanate is added during the first 10% of the time period and that at least 5% by weight of the total amount of the polyisocyanate is added during the last 10% of the time period; most preferably the addition is conducted at a constant speed (gram/minute) with a variance of 10% or less. The temperature is maintained at 60–120° C., preferably 80–110° C., while maintaining high shear conditions. Since the reaction between the ingredients is exothermic and since the high shear mixing generates heat some temperature control might be needed; this can be achieved by cooling or by slowing down or even interrupting temporarily the flow rate of the polyisocyanate or a combination thereof.

Once the polyisocyanate has been added the mixture is allowed to further react, while maintaining the temperature and mixing conditions for 10–120 minutes and preferably 15–60 minutes. Finally, the product according to the invention obtained is, if desired, allowed to cool to ambient temperature after high shear mixing is discontinued. The relative amounts of compound 1, compound 2 and polyisocyanate depend on the amount of particulate material desired and on the chosen specific ingredients. Since compound 1 and compound 2 are both reactive towards the polyisocyanate, although compound 2 is more reactive than compound 1, it is preferred to use compound 2 in an amount such that the total number of isocyanate-reactive hydrogens in the amount of compound 2 to be used exceeds the total number of isocyanate groups in the amount of polyisocyanate to be used, preferably the number of isocyanate-reactive hydrogens in compound 2 is 10–200 and more preferably 25–100% higher than the number of isocyanate groups.

Although a catalyst could be used, this preferably is not done. The process can be conducted batch-wise, semi-continuously or continuously. When the process is conducted batch-wise the total amount of polyol composition comprising particulate material made per batch preferably is at least 10 kg and more preferably at least 25 kg since the advantages of the process according to the present invention are particularly noticeable when such larger batches are made. Compound 1, optionally may comprise a small amount of previously made PIPA polyol, the amount being such that the amount of particulate material is 0.1–10 preferably 0.5–5% by weight.

When the aforementioned MDI, polymeric or crude MDI or the modified variants thereof are used, it was surprisingly found that the process according to the present invention leads to PIPA polyols having a low viscosity, i.e. a viscosity of 5000–25000 mPa.s at 25° C., at a high particulate material content, i.e. 40–80% by weight and preferably 40–70% by weight.

Therefore the present invention is further concerned with a polyol composition comprising particulate material in dispersed form and in an amount of 40–80% by weight calculated on the total composition, this composition having a viscosity of 5000–25000 mPa.s at 25° C. and the particulate material comprising reaction products of an isocyanate reactive compound comprising a plurality of hydroxyl, primary amine and/or secondary amine groups and having an equivalent weight of up to 400 and of diphenylmethane diisocyanate optionally comprising homologues thereof having and isocyanate functionality of 3 or more and/or modified variants of such polyisocyanates. Foams made from such a PIPA polyol show a surprisingly better compression set than foams made from PIPA polyols based on toluene diisocyanate.

EXAMPLE

Ingredients used: Daltocel F-428 (1124 kg) polyol (Daltocel is a trademark of Huntsman ICI Chemicals LLC; Daltocel-F-428 is a polyether polyol obtainable from Huntsman Polyurethanes); 380 kg of triethanolamine (99% pure, TELA) and 678 kg at Suprasec 2020 polyisocyanate (obtainable from Huntsman Polyurethanes, Suprasec is a trademark of Huntsman ICI Chemicals LLC).

The polyol was heated to 45° C. 1000 l of the polyol was subjected to high shear mixing and heated to 85° C. High shear mixing was stopped and the remainder of the polyol and the TELA were added separately. High shear mixing was started again and the mixture was heated to 82° C. while forming the emulsion of TELA in the polyol. The time between re-starting the high shear mixing and the mixture reaching the temperature of 82° C. was 45 minutes.

The polyisocyanate addition was started then and the mixture was cooled such that the temperature did not exceed 100° C.; the polyisocyanate was added at a speed of 1.35 liter/minute. After the polyisocyanate was added the batch was allowed to react for another 30 minutes while maintaining the temperature between 82 and 100° C. Then the high shear mixing was discontinued and the batch allowed to cool to ambient temperature. The high shear mixing was conducted with a Silverson HX-30 special at 1460 revolutions per minute. A polyol according to the present invention was obtained having about 50% by weight of particulate material dispersed therein. The viscosity of this PIPA polyol was 15000 mPa.s at 25° C.

Flexible polyurethane foams have been made with this PIPA polyol; the foams showing good properties, especially load bearing properties and compression set properties.

What is claimed is:

1. Process for preparing a polyol comprising particulate material in dispersed form, the amount of particulate material being 30–80% by weight calculated on the total composition wherein an isocyanate reactive compound comprising a plurality of hydroxyl, primary amine and/or secondary amine groups and having an equivalent weight of up to 400 is emulsified in a polyol, having an equivalent weight of 1000–5000 and an average nominal hydroxy functionality of 2–6, at a temperature of 60–100° C. under high shear mixing conditions, a diphenylmethane diisocyanate optionally comprising homologues thereof having an isocyanate functionality of 3 or more and/or modified variants of such polyisocyanates, is added gradually to the emulsion so formed while maintaining the temperature between 60–120° C. and while maintaining high shear conditions, the reacting mixture, obtained after all polyisocyanate has been added, is allowed to react further for a period of time of 10 minutes—2 hours while maintaining the temperature between 60–120° C., the high shear mixing is discontinued, and optionally the polyol so obtained and comprising the particulate material in an amount of 30–80% by weight in dispersed form is cooled to ambient temperature.

2. Process according to claim 1 wherein the polyol is a polyether polyol.

3. Process according to claim 1 wherein the isocyanate reactive compound is an alkanolamine wherein the alkanol groups have 2–6 carbon atoms.

4. Process according to claim 1 wherein the isocyanate reactive compound is triethanolamine.

5. Process according to claim 1 wherein the amount of particulate material is 40–70% by weight.

6. Polyol composition comprising particulate material in dispersed form and in an amount of 40–80% by weight calculated on the total composition, this composition having a viscosity of 5000–25000 mPa.s at 25° C. and the particulate material comprising reaction products of an isocyanate reactive compound comprising a plurality of hydroxyl, primary amine and/or secondary amine groups and having an equivalent weight of up to 400 and of diphenylmethane diisocyanate optionally comprising homologues thereof having an isocyanate functionality of 3 or more and/or modified variants of such polyisocyanates.

7. Polyol composition according to claim 6 wherein the amount of particulate material is 40–70% by weight.

8. Polyol composition according to claim 6 wherein the polyol is a polyether polyol.

9. Polyol composition according to claim 6 wherein the isocyanate reactive compound is an alkanolamine wherein the alkanol groups have 2–6 carbon atoms.

* * * * *